June 7, 1960 R. W. FLINT ET AL 2,940,016

MODULAR ELECTRICAL CHASSIS

Filed Sept. 15, 1955 2 Sheets-Sheet 1

INVENTORS:
RINARD W. FLINT
RICHARD R. TICE
BY Mauvell & Maxwell
AGENTS.

INVENTORS:
RINARD W. FLINT
RICHARD R. TICE
BY
Maxwell & Maxwell
AGENTS.

2,940,016

MODULAR ELECTRICAL CHASSIS

Rinard Wells Flint, Burbank, and Richard R. Tice, Studio City, Calif., assignors to UM & F Manufacturing Corporation, Burbank, Calif., a corporation of California Filed Sept. 15, 1955, Ser. No. 534,517

7 Claims. (Cl. 317—101)

Figures 1, 2:
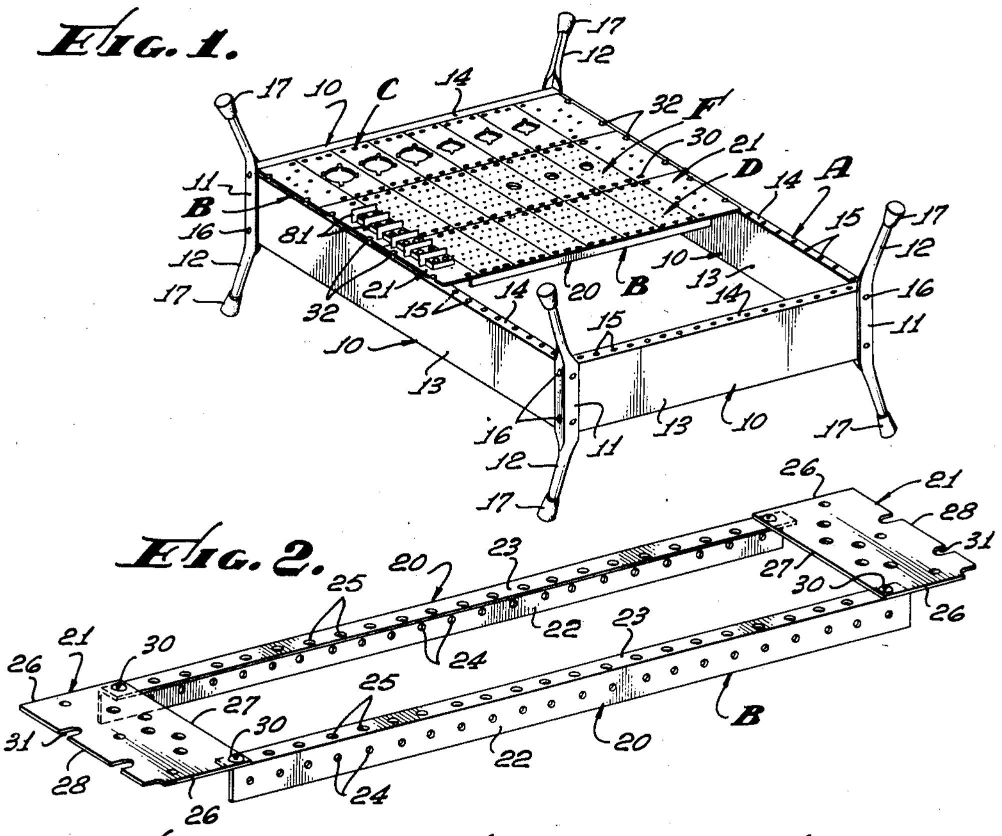

This invention relates to a modular electrical chassis and is particularly concerned with apparatus used in the development of electronic circuits and systems involving the assembly of components including vacuum tubes, capacitors, terminal posts and strips, etc., in order to facilitate their organization in a logical systematic manner.

Heretofore, electronic circuit designs have evolved on an additive basis involving a network or components and wiring soldered together and the mating of assemblies of this kind, and so on, as the system grows. This results in unnecessarily complicated wiring which is extremely difficult to correct, change, or modify. The present invention involves the use of modules each of which may include an individual portion of the electronic circuit and which may be separately built, tested, and tried in combination with other modules containing the other portions of the circuit.

A general object of this invention is to provide an electronic chassis wherein individual portions of the electrical circuit can be constructed and handled separately from the other portions of the circuit involved. In order to accomplish this result, there is provided, a plurality of like modular units which may be assembled together to combine with an overall electrical circuit or system.

It is an object of this invention to provide a universal support for an electrical chassis of the type under consideration wherein the chassis may be supported through any one of the sides thereof including the top or bottom side, and so that the chassis is supported in spaced relation to the supporting surface.

An object of this invention is to provide a chassis of the character referred to wherein various modular units are provided in order to receive and support various electrical components such as plugs and receptacles, tube sockets, capacitors, terminals and strips, etc. The modular units vary in size and proportioning and are made of different materials depending upon the component or components which are to be handled thereby.

Another object of this invention is to provide means for supporting the various modular units so that they form or present a single working surface or panel when assembled together to combine into a composite electrical system.

It is still another object of this invention to provide means for supporting modular units one above the other in a stack so that compound modules may be constructed as hereinafter described.

It is still another object of this invention to provide a simple and highly effective terminal for use in an electrical panel and which is adapted to be merely pressed into working position and which is adapted to receive wiring at the front end, at the back of the panel. The wiring is permanently joined to the terminal by means of the usual soldered connection.

An object of this invention is to provide a simple and inexpensive construction of the character above referred to which involves parts that are easily manufactured and which are easily assembled into the desired structural relationships with each other as circumstances require.

Figure 3:
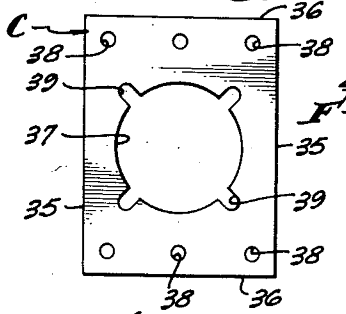
Figure 4:
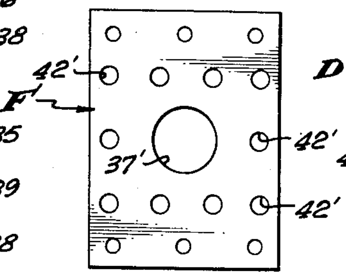
Figure 5:
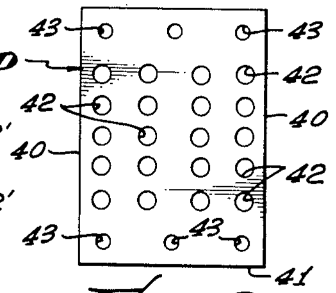
Figure 6:
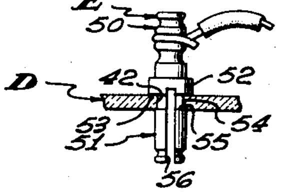
Figure 7:
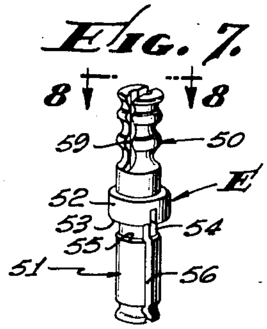
Figure 8:
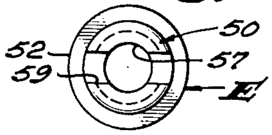
Figure 9:
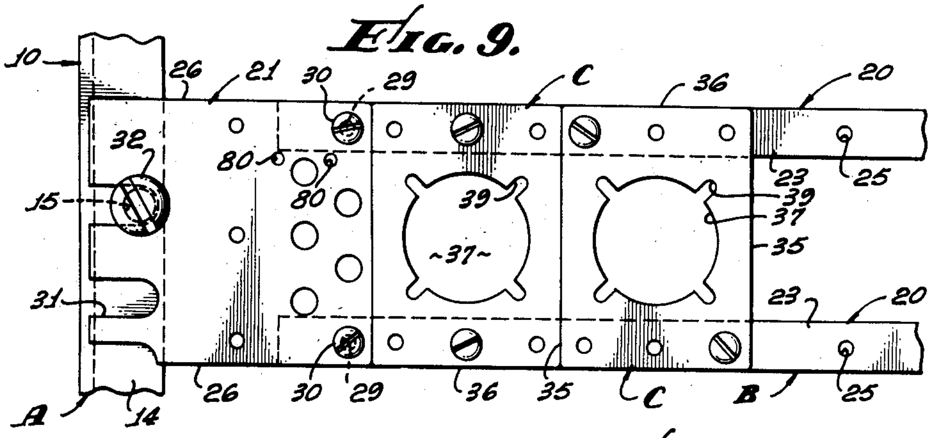
Figures 10, 11, 12, 13:
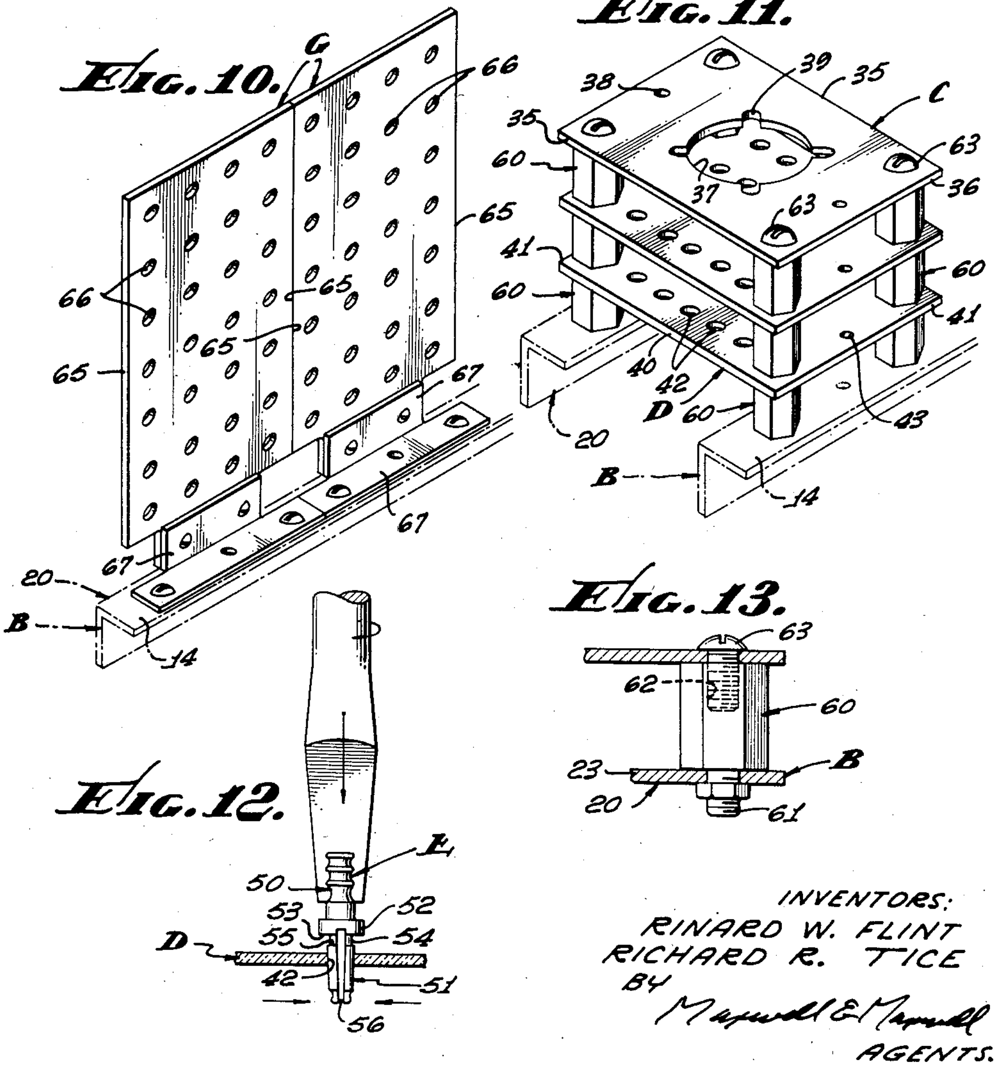

The various objects and features of our invention will be fully understood from the following detailed description of a typical preferred form and application of our invention, throughout which description reference is made to the accompanying drawings, in which:

Fig. 1 is a perspective view illustrating a partially completed chassis utilizing the construction provided by the present invention. Fig. 2 is an enlarged perspective view of a portion of the structure that we have provided. Figs. 3, 4, and 5 are enlarged views of the three forms of plates which are used to form the separate modular units of the structure of the present invention. Fig. 6 is an enlarged sectional view showing the terminal that we have provided. Fig. 7 is an enlarged perspective view of the terminal. Fig. 8 is an end view of the terminal taken as indicated by line 8—8 on Fig. 7. Fig. 9 is a plan view of the portion of the structure shown in Fig. 2 and showing the adapter which is used to have supporting engagement with the rack of the structure which is shown in Fig. 1 of the drawings. Fig. 10 is a perspective view of the terminal boards that we have provided. Fig. 11 is a perspective view of a plurality of plates supported one above the other by means of posts that we have provided. Fig. 12 is an enlarged view showing a tool such as a screw driver or the like, which may be employed to apply a terminal to the plate, and Fig. 13 is an enlarged sectional view of a post such as is illustrated in Fig. 11 of the drawings.

The chassis construction of our invention is useful in development work involving the design and building of electronic circuits or systems. Such systems are divisible into portions, each of which is provided for the performance of a particular function, and, therefore, the multiplicity of relatively small modular units that we have provided may each be used to advantageously carry the components or elements and wiring embodied in one of said portions of the system. It is to be understood, however, that some portions of a system may sometimes be of such extent as to incorporate two or more modular units of the construction that we have provided.

As illustrated throughout the drawings, the modular electrical chassis involves, generally, a rack A, one or more supports B, component plates C, terminal plates D, terminals E, component and terminal plates F, and terminal boards G. The rack A is provided to support the electronic panel formed by the other elements while the supports B are carried in the rack to carry the various individual modular units which characterize the invention. The plates C, D, and F, and the boards G, each receive the electrical components and wiring to form the modular units. The terminals E are employed as circumstances require and are pressed into working position in the plates C, D, and F, and in the boards G.

The rack A is a frame-like part adapted to support the entire assembly of elements so that the assembly is accessible from the top and the bottom thereof. Various rack constructions may be employed and in the drawings we have illustrated a typical bench rack involving like side rails 10, corners 11, and legs 12. The rack A is rectangular or square in plan configuration and each rail 10 forms a side thereof. The rails 10 are elongate parts that may vary in length in order to construct racks A of the desired dimension, and each involves a flat vertically disposed body 13 and a lateral horizontally disposed flange 14 substantially coextensive with the body 13. The flange 14 extends along one edge of the body 13 and is provided with a series of equally spaced holes 15 for receiving fasteners. The end portions of the body 13 are in the nature of tongues that project beyond the ends of the flange 14 to engage with the corners 11. A plurality of holes are provided in the end portions for receiving fasteners. The body 13 may be of substantial depth while the flange is of limited width sufficient to receive and carry the ends of the supports B hereinafter described.

The corners 11 are vertically disposed angular parts and are provided to couple the rails 10 together. The corners 11 have like legs that project laterally at right angles to each other to overlie the end portions or tongues of the rails 10. A plurality of holes are provided in the legs and are spaced to correspond with the holes in the end portions of the rails 10. Suitable fasteners 16 such as self-tapping screws or the like are applied to the registering holes in the rails 10 and corners 11 and act to secure the rails 10 together into a rigid rectangular frame-like structure.

The legs 12 are provided to support the rack A well above the supporting surface such as a bench, there being a leg 12 at each corner of the rack A. The legs 12 are positioned and related to the rack A to support the rack through any one of the sides thereof so that the panel is accessible from any side thereof. As shown, there are two sets of legs 12, one at the top of the rack and one at the bottom thereof so that the rack may be turned over if so desired. The legs 12 are formed as continuations of the corners 11 and are integral therewith in which case the corners 11 are extended to form the legs 12. Suitable pads 17 in the form of rubber tips are carried on the ends of the legs 12 to cushion the rack A. In accordance with the invention the legs 12 are angularly related to the plane of the rails 10 and project outwardly from the rack A. The legs are alike and by projecting them outwardly, the pads 17 engage the supporting surface to carry the rack A spaced therefrom. As shown, the corners 11 and legs 12 may be formed of sheet material bent to form the corners and rolled into tubular cross sections to form the legs.

The supports B are frame-like parts provided to carry the individual plates C, D, and F and to carry the boards G. The supports B are made to span the rack A between opposite side rails 10 thereof, and a plurality of supports B may be arranged side by side to be adjacent to and parallel with each other. As illustrated in the drawings, each support B involves, generally, a pair of body angles 20 and a pair of rack adapters 21. The body angles 20 are spaced and parallel with each other to extend between the rails 10 of the rack A while the rack adapters are provided at opposite ends of the angles 20 to have supporting engagement with the flanges 17 of the rails 10.

The body angles 20 are straight elongate elements with a vertically disposed leg 22 and a horizontally disposed leg 23. The vertically disposed leg 22 may be of considerable vertical extent while the horizontally disposed leg 23 is of limited horizontal extent sufficient to support or carry the plates C, D, and F. As shown, a series of holes 24 and 25 extend along the legs 22 and 23, respectively, for receiving fasteners. The holes 24 and 25 are equally and uniformly spaced.

The rack adapters 21 are flat horizontally disposed plate-like elements having parallel side edges 26 spaced apart to the desired spacing of the angles 20. The inner and outer ends 27 and 28 of the adapters 21 are straight and extend between the sides edges 26 to the end that the adapter 21 is a simple rectangular part. One or more fastener receiving holes 29 are provided in the adapter 21 at each side 26 thereof to occur at the inner end portion of the adapter and to register with the holes 25 in the legs 23 of the angles 20. With the angles 20 and adapters 21 assembled as shown in Figs. 2 and 9 of the drawings, there is an angle at each side 26 of the adapter 21, the elements being secured together by suitable fasteners such as self-tapping screws 30 or the like. In accordance with the invention, the end 28 of the adapter 21 is interrupted by fastener receiving openings 31 spaced to correspond with the spacing of the holes in the rail 10 of the body of the rack A. In practice, the openings are staggered so that the position of the support B on the rail 10 may be adjusted by selecting different holes 15. The outer end portions of the adpaters 21 extend beyond the ends of the angles 20 and overlie the flanges 14 of the rails 10 and are secured thereto by suitable fasteners 32 which may be self-tapping screws.

With the elements of the support B as above described, it will be apparent how a simple rectangular structure is easily and quickly assembled to have spaced parallel angles 20. The adapters 21 are placed on top of the angles 20 so that the top faces of the legs 23 are in a plane coincidental with the top faces of the flanges 14. In practice, the legs 23 of the angles 20 project inwardly toward each other so that the outer face of the legs 22 are in a vertical plane coincidental with the edges 26 of the adapters 21. It will be apparent how several supports B can be arranged side by side to completely occupy the rack A and that the legs 22 of adjacent angles 20 may be secured together by screw fasteners or the like passed through the holes 24.

The component plates C that we have provided are adapted to be carried by the supports B and to support components such as for example, a plug or receptacle or capacitor or like electrical parts. The plates C are alike and each is a relatively small rectangular part of sheet material such as metal and forms a base for a modular unit of the construction. The plate C has spaced parallel side edges 35 and parallel ends 36, and a suitable opening 37 is provided in the central portion of the plate while the end portions of the plate are provided with series of equally spaced holes 38. The holes 38 correspond in spacing with the holes 25 in the legs 23 of the support B so that the holes 38 and 25 register with each other when the parts are assembled. The opening 37 may be a round opening of suitable diameter and may be provided with adjacent or peripheral openings 39 that are adapted to receive fasteners for securing the component to the plate C. Suitable fasteners such as self-tapping screws may be provided to engage in the holes 38 and 25 in order to secure the plate C to the support B.

The terminal plates D that we have provided are, like the plates C, adapted to be carried by the supports B and are adapted to support a multiplicity or plurality of terminals E hereinafter described. The terminal plates D are alike and each is a relatively small rectangular part of sheet dielectric material such as electrical insulating board or phenolic and forms a base for a modular unit of the construction. The plates D are of the same shape and proportions as the plates C and each has spaced parallel side edges 40 and parallel ends 41. In accordance with the invention, the plate D is perforated by a plurality of openings 42, each opening being provided to receive a terminal E. The openings 42 are provided in rows and are equally spaced to present a uniform pattern. The number and spacing of the openings 42 may vary as circumstances require.

The end portions of the plates D are provided with series of equally spaced holes 43 corresponding in spacing with the holes 25 in the flange 23 so that the holes 43 and 25 register when the parts are assembled. Suitable fasteners such as self-tapping screws are provided to secure the plates D to the flanges 23 of the supports B. By providing a plate D of dielectric material such as phenolic, the multiplicity of terminals E that we provide are insulated one from the other. Further, with the multiplicity of openings 42 a selected number and positioning and relationship of terminals is easily employed.

The terminals E that we have provided are identical with each other and are adapted to be carried in the plates D. The terminals E are pressed into working position in the openings 42 in the plate, or in openings in the boards G hereinafter described, and as shown, the openings 42 are simple round openings in which case the terminals are round in cross section. The terminals E are elongate pin-like parts having top and bottom terminal posts 50 and 51 that extend above and below the plate D. The terminal E is characterized by an enlarged hub 52 intermediate the ends thereof that has a downwardly facing stop shoulder 53. The terminal posts 50 and 51 are substantially smaller in diameter than the hub 52, the post 51 being somewhat larger in diameter than the openings 42 through the plates. The terminal post 51 is turned at 54 to be of the same diameter as the openings 42 so that there is an upwardly facing shoulder 55 opposed to and facing the shoulder 53. The shoulders 53 and 55 are spaced apart a distance substantially equal to the thickness of the material forming the plate D.

In order to assemble the terminal E with the plate D, the terminal post 51 is split by providing a slot 56 which extends from the bottom end of the terminal and into the hub portion 52 thereof. By providing the slot 56, the split portion of the terminal is flexible and is deflected or compressed, as shown in Fig. 12, thereby allowing the terminal post to enter the opening 42. When the terminal E is in proper working position, the split portion expands so that the shoulder 55 engages with the bottom face of the plate D.

The terminal E that we have provided is a solder terminal and is adapted to receive and make connection with a plurality of wires at both the top and bottom posts 50 and 51 thereof. In order to provide mechanical engagement between the posts and a wire conductor to be connected therewith, the top terminal post 50 is also split by means of a slot 59. By slotting the terminals at both ends as we have provided, the wire conductor can be inserted into the slot and wound onto the terminal to be keyed thereto against rotation. In order to prevent longitudinal displacement of the wire conductors from the terminal posts, we have provided one or more grooves at the end portions of both the top and bottom terminal posts 50 and 51. Further, the terminal E has a central bore 57 coextensive therewith that is adapted to receive the end of a wire conductor. It will be apparent that there are many ways in which wire conductors can be mechanically engaged with the terminal that we have provided after which it is a simple matter to solder the terminal so that the electrical connection is permanent.

The component and terminal plates F that we have provided are, like the plates C and D, adapted to be carried by the support B and to support a plurality of terminals E as well as components such as a resistance element or capacitor or the like. The plates F are alike and each is a relatively small rectangle of sheet dielectric material such as electrical insulating board or phenolic and forms a base for a modular unit of the construction. The plate F is of the same shape and proportion as the plates C and D and has spaced parallel side edges and parallel ends. There are holes for fasteners in the end portions of the plate and a component handling opening 37′ may be provided at the center portion of the plate. Terminal handling openings 42′ are provided in a suitable pattern surrounding the opening 37′ in order to receive terminals as circumstances require. It will be apparent that the plates F may handle both an electrical component and the terminals and wiring necessary for the electrical circuit that may be involved.

In accordance with the invention, we have provided means for mounting or supporting the plates C, D, and F, one above the other in spaced relationship. For this purpose, there are like posts 60, each having a threaded stud 61 projecting from one end thereof and a threaded socket 62 in the other end thereof. In the preferred form, the posts 60 is polygonal in cross section in order to be engaged by a tool such as a wrench. The studs 61 are engageable in the fastener holes in the plates and legs 23 of the support B and screws 63 may be used to secure the uppermost plate in place to be supported by the posts 60.

The terminal boards G that we have provided are flat panels of dielectric insulating board or phenolic and are adapted to receive the terminals E. As shown, the boards G are vertically disposed and each is a relatively small element of the same width or extent as the plates C, D, and F. The side edges 65 of the terminal boards G are straight and parallel, and when the boards are arranged side by side, a single continuous panel is, in effect, formed. As illustrated in Fig. 10, the terminal boards G are perforated with terminal receiving openings 66 adapted to receive and support the terminals E hereinabove described. The terminal boards G are supported by brackets 67 which may be integral with the boards or separate therefrom, as shown, and which are provided with holes spaced to register with the fastener receiving holes in the plates or support, etc., so that the boards G may be securely fastened to the plates by means of screws or the like.

In accordance with the invention, terminal strips 81 of varying length and of suitable design may be fastened to the adapters 21 of the structure at any desired point by screw fasteners or the like that enter the fastener receiving holes 80 that are provided for that purpose. (See Figs. 1 and 9.)

From the foregoing, it will be apparent that we have provided an extremely simple and effective combination of elements for the development of electronic circuitry wherein the several basic elements of the structure may be combined in a most advantageous manner. It is particularly important that the structure is made up of modular units which may be individually constructed and then secured in working position. The modular units are constructed on the plates C, D, and F, and on the boards G which may be of like size or multiples thereof, or divisions thereof. If any one of the modulator units is misplaced or requires replacing, it is a simple matter to remove said unit putting another replacement unit in its place all without disturbing the remaining or other modular units. The wiring or connections between the different modulator units is easily made by utilizing the terminals that we have provided which may mechanically connect wires for temporary contact or which may be soldered to the wires for permanent contact. Each of the supports B is an elongate structure which carries a plurality of modular units and which in itself can be considered a module of construction. That is, each support B may be wired as a self-contained unit of the overall electrical circuit and may be completed individually and then inserted into working position in the rack A and removed therefrom without destroying the other portions and the electrical circuits.

Having described only a typical preferred form and application of our invention, we do not wish to be limited or restricted to the specific details herein set forth, but wish to reserve to ourselves any variations or modifications that may appear to those skilled in the art and fall within the scope of the following claims.

Having described our invention, we claim:

1. A modular chassis including, an open horizontally disposed rectangular frame-like rack having parallel side rails with horizontally disposed flanges with longitudinally spaced fastener receiving openings, a plurality of elongate supports having spaced parallel body angles with horizontally disposed legs with spaced fastener receiving openings, plate-like adapters fixed to and extending into the ends of the angles for supporting engagement with the rack, said adapters having spaced fastener receiving openings to register with the openings in the flanges, and elongate plates of like size and proportion and multiples thereof carried in a series by the legs, each plate having spaced fastener receiving openings at its ends to register with the openings in said legs, the plates being adapted to be individually applied to and removed from the support and to carry electrical components and terminals.

2. A modular chassis including, an open rectangular horizontally disposed frame-like rack having parallel side rails with horizontally disposed apertured flanges, an elongate horizontally disposed support having spaced parallel body angles with horizontally disposed apertured legs, horizontally disposed plate-like adapters at the ends of the angles and having openings registering with apertures in the flanges, elongate horizontally disposed plate of like size and proportion and multiples thereof carried in a series by the legs, each plate having openings at its ends registering with apertures in the legs, each plate adapted to be individually applied to and removed from the support, one of said plates having an opening and an electrical component releasably engaged in said opening, and screw fasteners engaged in the registered apertures and openings.

3. A chassis of the character described including, an open horizontally disposed rectangular frame-like rack having a rectangular frame-like rack having parallel side rails with vertically disposed bodies and horizontally disposed flanges, vertically disposed corners joined with and coupling the adjacent ends of the rails, and elongate legs on axes angularly related to and extending outwardly from the plane of the bodies of the rails and projecting diagonally from the corners at the top and bottom sides of the rack to support the rack in spaced relation to a supporting surface, and a plurality of elongate supports having spaced parallel body angles and end adapter plates to engage the rails and support the body angles in the rack, and a plurality of plates releasably secured to and extending between the body angles of each support and adapted to carry an electrical component.

4. A sub assembly for an electrical chassis of the character described including, a pair of elongate horizontally disposed body angles with horizontally disposed legs, a pair of adapter plates fixed to and extending between opposite ends of the body angles to maintain said angles in spaced parallel relationship and a plurality of plates releasably secured to the angles to extend therebetween in a series extending longitudinally of the angles and between said adapter plates, each plate adapted to carry an electrical component, said adapter plates adapted to be releasably secured to a suitable rod to support the angles, plates and electrical components related thereto.

5. A sub assembly for an electrical chassis of the character described including, a pair of elongate, horizontally disposed body angles with horizontally disposed legs with longitudinally spaced fastener receiving openings therein, a pair of adapter plates having fastener receiving openings therein to register with openings at the ends of the angles and fixed to the ends of the angles by means of fasteners to extend between opposite ends of the body angles to maintain said angles in spaced parallel relationship, a plurality of elongate rectangular plates with spaced fastener receiving openings in the opposite ends to register with openings in the angles, and fasteners releasably securing the plates to the angles to extend therebetween in a series extending longitudinally of the angles and between said adapter plates, each plate having an opening therein to receive and carry an electrical component, said adapter plate adapted to be releasably secured to a suitable rod to support the angles, plates and electrical components related thereto.

6. A sub assembly for an electrical chassis of the character described including, a pair of elongate, horizontally disposed body angles with horizontally disposed legs with longitudinally spaced fastener receiving openings therein a pair of adapter plates having fastener receiving openings therein to register with openings at the ends of the angles and fixed to the ends of the angles by means of fasteners to extend between the opposite ends of the body angles to maintain said angles in spaced parallel relationship, a plurality of elongate rectangular, perforated plates with spaced fastener receiving openings in the opposite ends to register with openings on the angles, and fasteners releasably securing the plates to the angles to extend therebetween in a series extending longitudinally of the angles and between said adapter plates, and terminals releasably engaged in the perforations in the plates, said adapter plates adapted to be releasably secured to a suitable rod to support the angles, plates and electrical components related thereto.

7. A sub assembly for an electrical chassis of the character described including, a pair of elongate, horizontally disposed body angles with horizontally disposed legs with longitudinally spaced fastener receiving openings therein, a pair of adapter plates having fastener receiving openins therein to register with openings at the ends of the angles and fixed to the ends of the angles by means of fasteners to extend between the opposite ends of the body angles to maintain said angles in spaced parallel relationship, a plurality of elongate rectangular, perforated plates with spaced fastener receiving openings in the opposite ends to register with openings in the angles, and fasteners releasably securing the plates to the angles to extend therebetween in a series extending longitudinally of the angles and between said adapter plates, and terminals releasably engaged in the perforations in the plates, each plate having an enlarged opening therein to receive and carry an electrical component, said adapter plates adapted to be releasably secured to a suitable rod to support the angles, plates and electrical components related thereto.

References Cited in the file of this patent

UNITED STATES PATENTS

| | | |
|---|---|---|
| 1,400,007 | Sparks | Dec. 13, 1921 |
| 2,309,323 | Lear | Jan. 26, 1943 |
| 2,343,284 | Dodington | Mar. 7, 1944 |
| 2,424,966 | Buchanan | Aug. 5, 1947 |
| 2,568,535 | Ballard | Sept. 18, 1951 |
| 2,579,141 | Eckert et al. | Dec. 18, 1951 |
| 2,814,024 | Narozny | Nov. 19, 1957 |

FOREIGN PATENTS

| | | |
|---|---|---|
| 344,668 | Great Britain | Mar. 12, 1931 |
| 571,411 | Germany | Mar. 2, 1933 |
| 592,686 | Great Britain | Sept. 25, 1947 |
| 649,254 | Great Britain | Jan. 24, 1951 |
| 691,308 | Great Britain | May 13, 1953 |